(12) United States Patent
Zhang et al.

(10) Patent No.: US 11,532,873 B2
(45) Date of Patent: Dec. 20, 2022

(54) WEARABLE DEVICE ANTENNA SHIELDS AND RELATED SYSTEMS AND METHODS

(71) Applicant: META PLATFORMS TECHNOLOGIES, LLC, Menlo Park, CA (US)

(72) Inventors: Ce Zhang, Redmond, WA (US); Meijiao Li, Newark, CA (US); Geng Ye, San Jose, CA (US); Bruno Cendon Martin, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 59 days.

(21) Appl. No.: 17/201,177

(22) Filed: Mar. 15, 2021

(65) Prior Publication Data

US 2022/0294100 A1    Sep. 15, 2022

(51) Int. Cl.
*H01Q 1/24* (2006.01)
*H01Q 1/27* (2006.01)
*H01Q 1/52* (2006.01)

(52) U.S. Cl.
CPC ............ *H01Q 1/273* (2013.01); *H01Q 1/523* (2013.01); *H01Q 1/526* (2013.01); *H01Q 1/242* (2013.01); *H01Q 1/243* (2013.01); *H01Q 1/244* (2013.01)

(58) Field of Classification Search
CPC ........ H01Q 1/273; H01Q 1/523; H01Q 1/526; H01Q 1/242; H01Q 1/243; H01Q 1/244
See application file for complete search history.

(56) References Cited

U.S. PATENT DOCUMENTS

| | | |
|---|---|---|
| 9,531,077 B1 | 12/2016 | Weller et al. |
| 10,243,414 B1 * | 3/2019 | Leabman ............... H02J 50/20 |
| 2008/0079638 A1 | 4/2008 | Choi et al. |
| 2017/0201026 A1 | 7/2017 | Werner et al. |
| 2017/0237459 A1 | 8/2017 | Kim et al. |

FOREIGN PATENT DOCUMENTS

WO    2019126175 A1    6/2019

OTHER PUBLICATIONS

International Search Report and Written Opinion for International Application No. PCT/US2022/020083, dated Jun. 28, 2022, 14 pages.
Sanz-Izquierdo B., et al., "Dual Polarized Reconfigurable Frequency Selective Surfaces," IEEE Transactions on Antennas and Propagation, vol. 62, No. 2, Nov. 20, 2013, pp. 764-771.

\* cited by examiner

*Primary Examiner* — Joseph J Lauture
(74) *Attorney, Agent, or Firm* — FisherBroyles, LLP

(57) ABSTRACT

The disclosed wearable electronic device may include an enclosure, an antenna positioned within the enclosure and configured to radiate electromagnetic signals, a non-conductive substrate positioned within the enclosure, a first surface of the non-conductive substrate being in a position to face a user of the wearable electronic device and a second, opposite surface of the non-conductive substrate facing the antenna, and a patterned conductive material disposed on the second, opposite surface of the non-conductive substrate, wherein the patterned conductive material has a shape and configuration to reduce electromagnetic signals radiated in a direction towards the user of the wearable electronic device. Various other related methods and systems are also disclosed.

20 Claims, 15 Drawing Sheets

WEARABLE DEVICE ANTENNA SHIELDS AND RELATED SYSTEMS AND METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
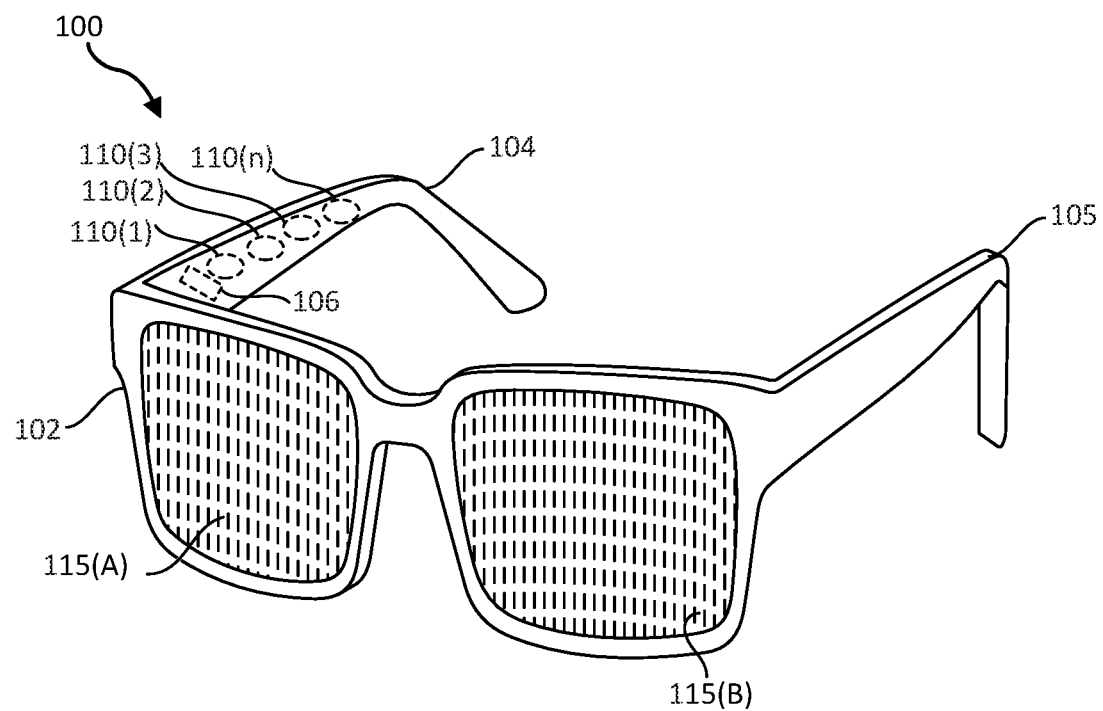
FIG. 1 is a perspective view of an example wearable device, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Wearable electronic devices have the potential to increase the convenience and functionality of connecting users to the Internet and other devices. Wearable electronic devices may enable applications such as augmented reality, mobile healthcare, gaming, social media, messaging, entertainment, etc. Many wearable device applications require wireless communications for transfer of application data. One of the potential challenges of integrating wireless communications into wearable devices is reducing radio frequency (RF) radiation in the direction of the user, while increasing total radiated power directed away from the user.

In some embodiments, users of wearable electronic devices may absorb a portion of transmitted radiation, thereby reducing the amount of radiated power transmitted to other devices (e.g., access points, base stations, other electronic devices, etc.). For example, an electronic device worn on a user's head (e.g., smart eyeglasses) may have a portion of the transmitted radiation absorbed by the user's head. Advantages of embodiments of the present disclosure may include reducing the amount of electromagnetic signals (e.g., RF radiation) directed towards the user of the wearable electronic device while increasing the amount of RF radiation directed away from the user.

The present disclosure details systems, devices, and methods related to controlling the direction and/or magnitude of RF radiation emitted from a mobile electronic device (e.g., a wearable device, smart eyeglasses, a smartwatch, a wristband system, etc.). In some examples, a wearable device may include an enclosure (e.g., a temple arm, a frame, a housing, etc.) and an antenna positioned within the enclosure. The antenna may be configured to radiate electromagnetic signals, such as in conformance with a wireless communication standard (e.g., WiFi, Bluetooth™, 3G, 4G, 5G, 6G, etc.). The wearable device may include a non-conductive substrate positioned within the enclosure. One surface of the non-conductive substrate may face a user of the wearable device and a second, opposite surface of the non-conductive substrate may face the antenna. A patterned conductive material may be disposed on the second, opposite surface of the non-conductive substrate. The patterned conductive material may be shaped and configured to reduce electromagnetic signals radiated in a direction towards the user of the wearable electronic device and increase the electromagnetic signals radiated in a direction away from the user of the wearable electronic device. The wearable device may include an antenna that emits radiation and a shield between the antenna and the user that reduces the amount of radiation directed towards the user. The shield may protect the user from absorbing the emitted radiation. The shield may also redirect the emitted radiation away from the user towards another electronic device, such as a WiFi router or cellular base station. The radiation redirected towards the WiFi router or cellular base station may increase the communication bandwidth for the wearable device.

Figure 2:
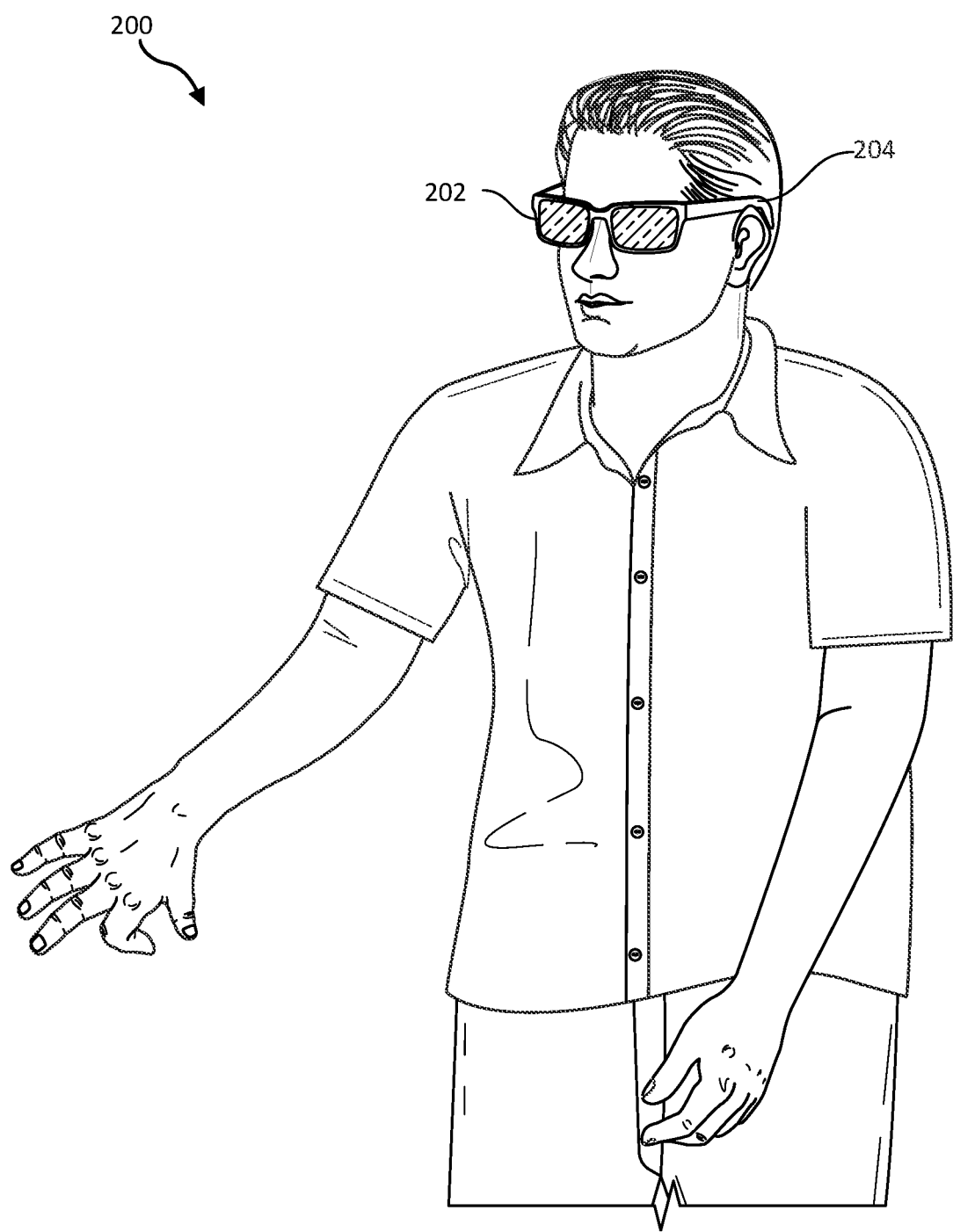
FIG. 2 is a perspective view of a user wearing an example wearable device, according to at least one embodiment of the present disclosure.

The following will provide, with reference to FIGS. 1-2, detailed descriptions of a wearable device that includes a radiating antenna and electromagnetic shield (e.g., an antenna shield). A description of a wearable device enclosure, a non-conductive substrate, a patterned conductive material, and a radiating antenna is presented in reference to FIGS. 3-4. A description of a cross-section of patterned conductive materials disposed on a substrate and an antenna within an enclosure is presented in reference to FIG. 5. A detailed description of an array of patterned conductive materials is presented in reference to FIG. 6. A description of electromagnetic signals radiating in directions relative to an array of patterned conductive materials is presented in reference to FIG. 7. A description of stop-band characteristics of an antenna shield is presented in reference to the chart of FIG. 8. A description of a chart illustrating directional antenna gain resulting from an antenna shield is presented in reference to the chart of FIG. 9. A method of manufacturing an antenna shield for a wearable device is presented in reference to FIG. 10. A description of various types of example artificial-reality devices that may be used in conjunction with a wearable electronic device is presented in reference to FIGS. 11-15.

FIG. 1 illustrates a perspective view of an example wearable electronic device in the form of smart eyeglasses 100. Smart eyeglasses 100 may include a lens frame 102 configured to hold a right display device 115(A) and a left display device 115(B) in front of a user's eyes. Display devices 115(A) and 115(B) may act together and/or independently to present an image or series of images to a user. Smart eyeglasses 100 may include an enclosure 104 (e.g., a temple arm) configured to house electronic components. Enclosure 104 may be configured to house wireless communication components including, without limitation, a printed circuit board, a baseband processor, a radio frequency integrated circuit (e.g., a transceiver), at least one antenna 106, a non-conductive substrate, and patterned conductive materials 110(1) . . . 110(n). As will be described below with reference to FIGS. 3-9, patterned conductive materials 110(1) . . . 110(n) disposed on a non-conductive substrate may reduce electromagnetic signal strength in a direction towards a user wearing smart eyeglasses 100, while increasing electromagnetic signal strength in a direction away from the user wearing smart eyeglasses 100.

Although FIG. 1 shows a single enclosure 104 (e.g., a right temple arm) configured to house electronic components, the present disclosure is not so limited. In additional embodiments, any portion of smart eyeglasses 100 may be configured to house electronic components. For example, lens frame 102 and/or left temple arm 105 may be configured to house electronic components. In some examples, smart eyeglasses 100 may include augmented-reality glasses 1520 of FIG. 15.

FIG. 2 is a perspective view of a user 200 wearing an example wearable device, according to at least one embodiment of the present disclosure. User 200 may wear smart eyeglasses 202. In some examples, smart eyeglasses 202 may be configured to execute functions including, without limitation, displaying visual content to user 200 (e.g., visual content displayed on right display device 115(A) and left display device 115(B) of FIG. 1), sensing user input (e.g., sensing a touch, sensing biometric data, sensing neuromuscular signals, sensing eye movement, etc.), messaging (e.g., text, speech, video, etc.), capturing images, determining location, performing financial transactions, providing haptic feedback, performing wireless communications (e.g., Long Term Evolution (LTE), 3G, 4G, 5G, 6G, near field, WiFi, Bluetooth™, personal area network, etc.). In some examples, the wireless communications functions may be executed using an inverted F antenna (e.g., antenna 506 of FIG. 5), a slot antenna, a trace antenna, a patch antenna, a branch antenna, an enclosure antenna, or a combination thereof.

Smart eyeglasses 202 may include patterned conductive materials (e.g., patterned conductive materials 110(1) . . . 110(n) of FIG. 1) disposed on a non-conductive substrate that reduces electromagnetic signal strength in a direction towards user 200 while increasing electromagnetic signal strength in a direction away from user 200. Reducing the electromagnetic signal strength in a direction towards user 200 may reduce an amount of radiation absorbed by user 200. Increasing electromagnetic signal strength in a direction away from user 200 may increase the link margin, coverage area, bandwidth, and reliability of the wireless communications associated with smart eyeglasses 202.

The patterned conductive materials, antenna, and non-conductive substrate may be disposed in an enclosure of smart eyeglasses 202. For example, the patterned conductive materials, antenna, and non-conductive substrate may be disposed in a temple arm 204 (or both temple arms) of smart eyeglasses 202.

Figure 3:
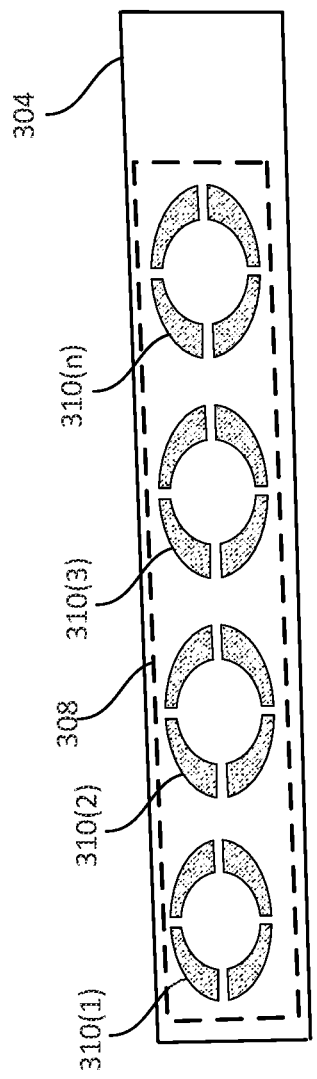
FIG. 3 is a plan view of patterned conductive materials disposed on a non-conductive substrate, according to at least one embodiment of the present disclosure.

FIG. 3 is a plan view of patterned conductive materials 310(1) . . . 310(n) disposed on a non-conductive substrate 308, according to at least one embodiment of the present disclosure. In some examples, patterned conductive materials 310(1) . . . 310(n) disposed on non-conductive substrate 308 may be housed in an enclosure 304. Enclosure 304 may include any type of enclosure that houses electronic components. For example, enclosure 304 may include, without limitation, a temple arm (e.g., temple arm 204 of FIG. 2), a smartphone enclosure, a smartwatch enclosure, a head-mounted display, a fitness tracker, a smart garment, a body cam, a gaming glove, a hands-free headset, or a combination thereof. Patterned conductive materials 310(1) . . . 310(n) may include any material capable of filtering, reducing, and/or redirecting electromagnetic signals. For example, patterned conductive materials 310(1) . . . 310(n) may include a metamaterial, a metal (e.g., copper, brass, nickel, silver, steel, tin, gold, etc.), a metal alloy, a conductive screen, a mesh, or a combination thereof.

In some examples, patterned conductive materials 310(1) . . . 310(n) may include a material (e.g., a metamaterial) configured to manipulate (e.g., shield, block, absorb, dampen, enhance, redirect, etc.) electromagnetic signals. In some examples, patterned conductive materials 310(1) . . . 310(n) may derive their electromagnetic shielding properties from their physical structures and/or physical properties. The pattern, shape, geometry, size, orientation, and/or arrangement of patterned conductive materials 310(1) . . . 310(n) may determine the properties capable of manipulating electromagnetic signals. In some examples, the physical structures may be at scales that are smaller than the wavelengths of the electromagnetic signals being manipulated.

Patterned conductive materials 310(1) . . . 310(n) may be disposed on non-conductive substrate 308 (e.g., a flexible substrate). Non-conductive substrate 308 may be any material that physically supports patterned conductive materials 310(1) . . . 310(n). For example, non-conductive substrate 308 may include a flexible material capable of supporting patterned conductive materials 310(1) . . . 310(n) while conforming to the physical shape of enclosure 304. Non-conductive substrate 308 may include a flexible printed circuit board, a printed circuit board, a fiberglass substrate, a flexible plastic substrate, a polyimide substrate, a polymer thick film, or a combination thereof. In some examples, patterned conductive materials 310(1) . . . 310(n) may be directly supported by enclosure 304 without support from non-conductive substrate 308. In other words, a wall of enclosure 304 may itself be or include a non-conductive material acting as a substrate for the patterned conductive materials 310(1) . . . 310(n).

Figure 4:
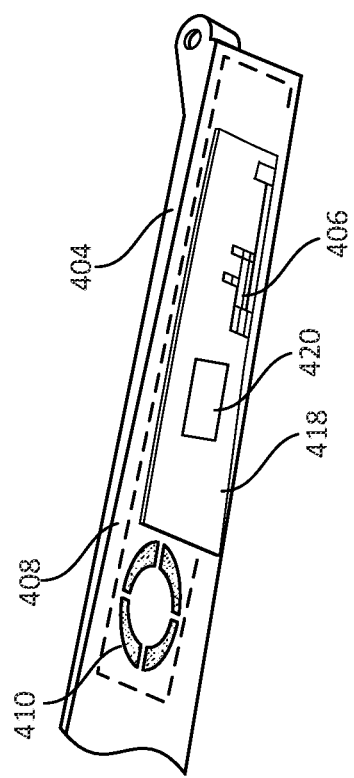
FIG. 4 is a perspective view of patterned conductive materials and an antenna within an enclosure, according to at least one embodiment of the present disclosure.

FIG. 4 is a perspective view of patterned conductive material 410 and an antenna 406 within an enclosure 404, according to at least one embodiment of the present disclosure. As described with reference to FIGS. 3, 5, and 6, patterned conductive material 410 may be disposed on non-conductive substrate 408 and housed in enclosure 404. Enclosure 404 may be part of a wearable electronic device (e.g., smart eyeglasses). Enclosure 404 may include a wireless communication circuit that allows the wearable electronic device to communicate with access points, servers, other devices, controllers, etc. The wireless communication circuit may include a printed circuit board 418 on which a radio frequency circuit 420 is mounted. Radio frequency circuit 420 may drive antenna 406 (e.g., an inverted F antenna, a monopole antenna, a slot antenna, a trace antenna, a patch antenna, a branch antenna, an enclosure antenna, etc.) with electromagnetic signals that are radiated from antenna 406. In some examples, the electromagnetic signals may be radiated generally away from a user of a wearable electronic device that includes antenna 406, although some portion of the electromagnetic signals may also be radiated towards the user.

Patterned conductive material 410 disposed on non-conductive substrate 408 may shield the user from the electromagnetic signals radiated from antenna 406. The antenna radiation may be redirected away from the user towards the ambient environment such that the energy from the electromagnetic signals received by the user is reduced as compared to the energy received by the user without the use of patterned conductive material 410 disposed on non-conductive substrate 408. The total radiation efficiency of antenna 406 may be improved due to less RF energy being absorbed by the user and more RF energy being reflected by the patterned conductive material 410 disposed on non-conductive substrate 408 to the ambient environment (e.g., towards an access point, towards a base station, etc.). Some embodiments of the present disclosure may improve the wireless link margin budget of a wearable electronic device by about 1.0 dB, by about 2.0 dB, by about 3.0 dB, by about 4.0 dB, or more.

Figure 5:
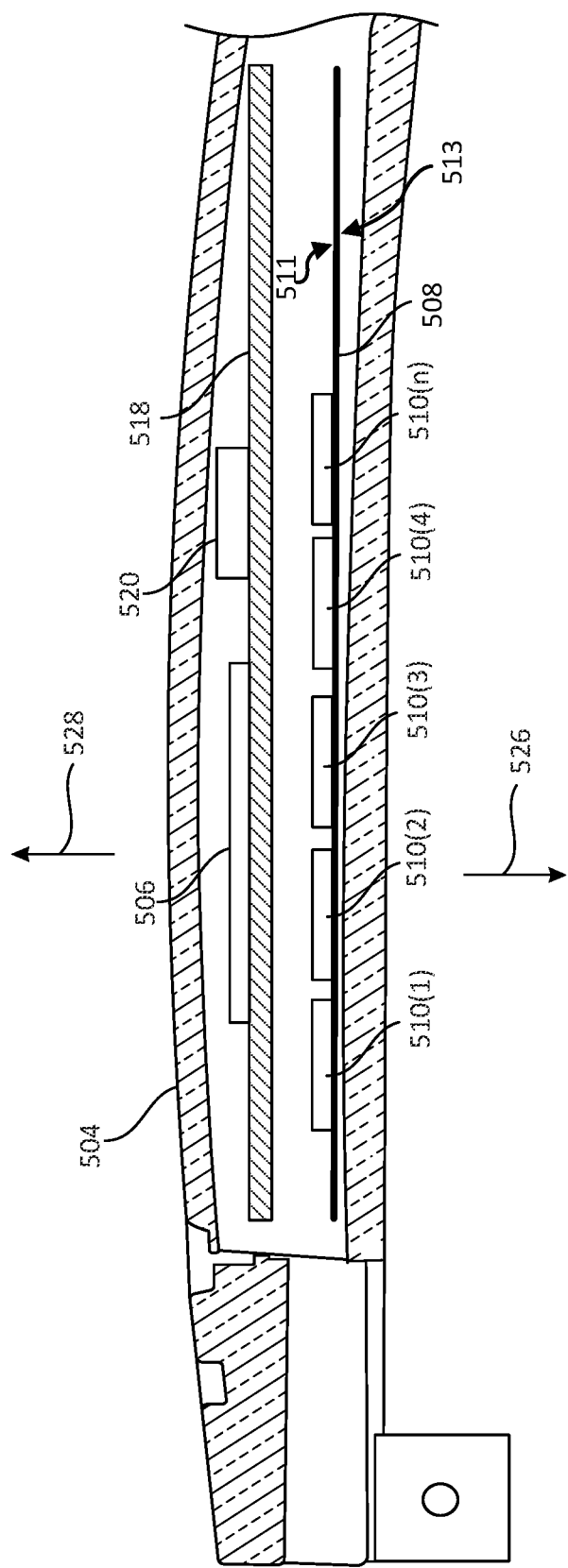
FIG. 5 is a cross-sectional view of patterned conductive materials disposed on a substrate and an antenna within an enclosure, according to at least one embodiment of the present disclosure.

FIG. 5 is a cross-sectional view of patterned conductive materials 510(1) . . . 510(n) disposed on a non-conductive substrate 508 within an enclosure 504, according to at least one embodiment of the present disclosure. In some examples, non-conductive substrate 508 may be positioned within enclosure 504 such that a first surface 513 of non-conductive substrate 508 is positioned to face a user of the wearable electronic device and a second, opposite surface 511 of non-conductive substrate 508 faces antenna 506. Patterned conductive materials 510(1) . . . 510(n) may be disposed on one of the surfaces 511, 513 of non-conductive substrate 508, such as on second, opposite surface 511. Electromagnetic signals radiated from antenna 506 may be filtered (e.g., shielded, redirected, reduced, blocked, etc.) by patterned conductive materials 510(1) . . . 510(n) disposed on non-conductive substrate 508, thereby reducing an amount of electromagnetic energy absorbed by a user wearing enclosure 504 (e.g., a smart eyeglasses temple arm).

Figure 9:
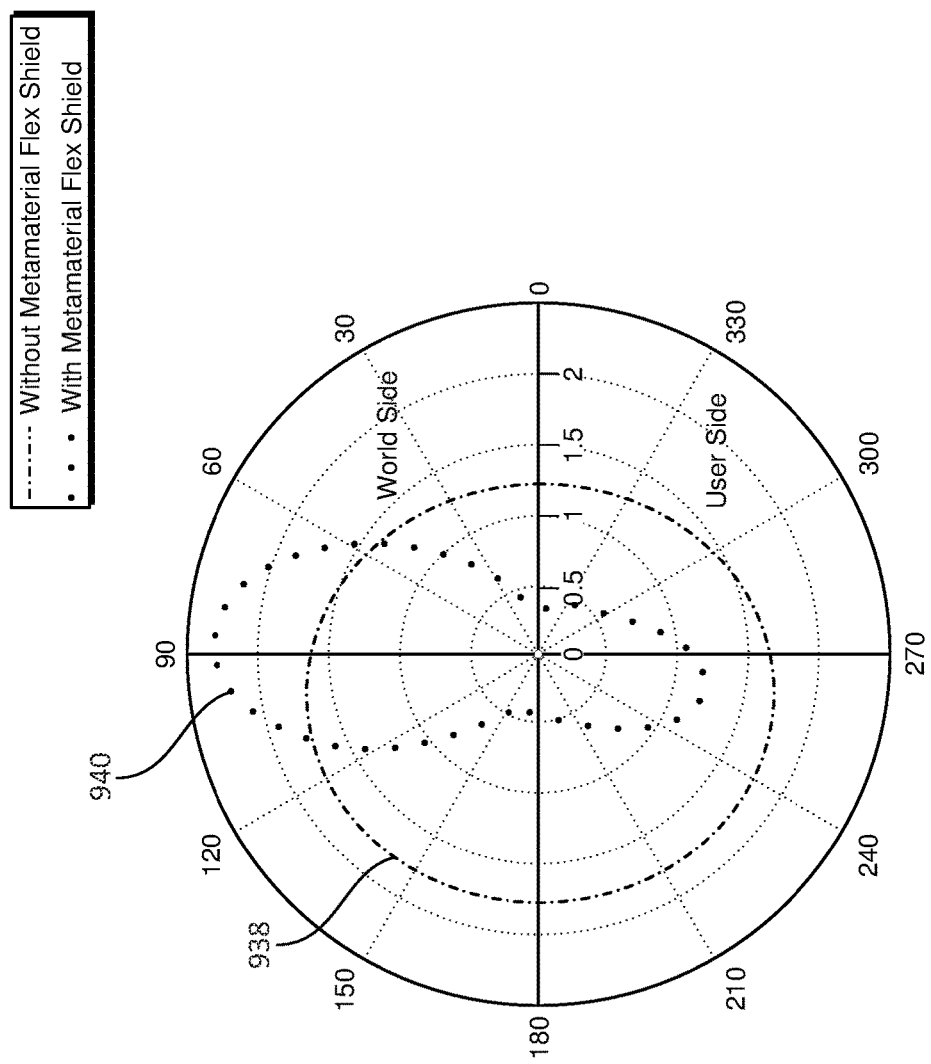
FIG. 9 is a chart illustrating directional antenna gain resulting from an antenna shield, according to at least one embodiment of the present disclosure.

Enclosure 504 may include a printed circuit board 518 on which a radio frequency circuit 520 is mounted and configured to communicate with access points, servers, other devices, etc. Radio frequency circuit 520 may drive antenna 506 such that electromagnetic signals are radiated from antenna 506. Patterned conductive materials 510(1) . . . 510(n) disposed on non-conductive substrate 508 may be electrically isolated (e.g., electrically floating) from radio frequency circuit 520, antenna 506, ground, electrical components associated with printed circuit board 518, and/or other conductive materials within enclosure 504. In some examples, the electromagnetic signals may be radiated away from the user of the wearable electronic device in a general direction indicated by arrow 528. Although direction arrow 528 shows a direction substantially orthogonal to antenna 506, the present disclosure is not so limited and the electromagnetic signals may radiate in a pattern as shown in FIG. 9.

Patterned conductive materials 510(1) . . . 510(n) disposed on non-conductive substrate 508 may shield the user from the electromagnetic signals radiated from antenna 506. The antenna radiation may be redirected generally away from the user towards the ambient environment as indicated by arrow 528 such that the energy from the electromagnetic signals in a direction indicated by arrow 526 is reduced as compared to the energy received by the user without the use of patterned conductive materials 510(1) . . . 510(n) disposed on non-conductive substrate 508.

Figure 6:
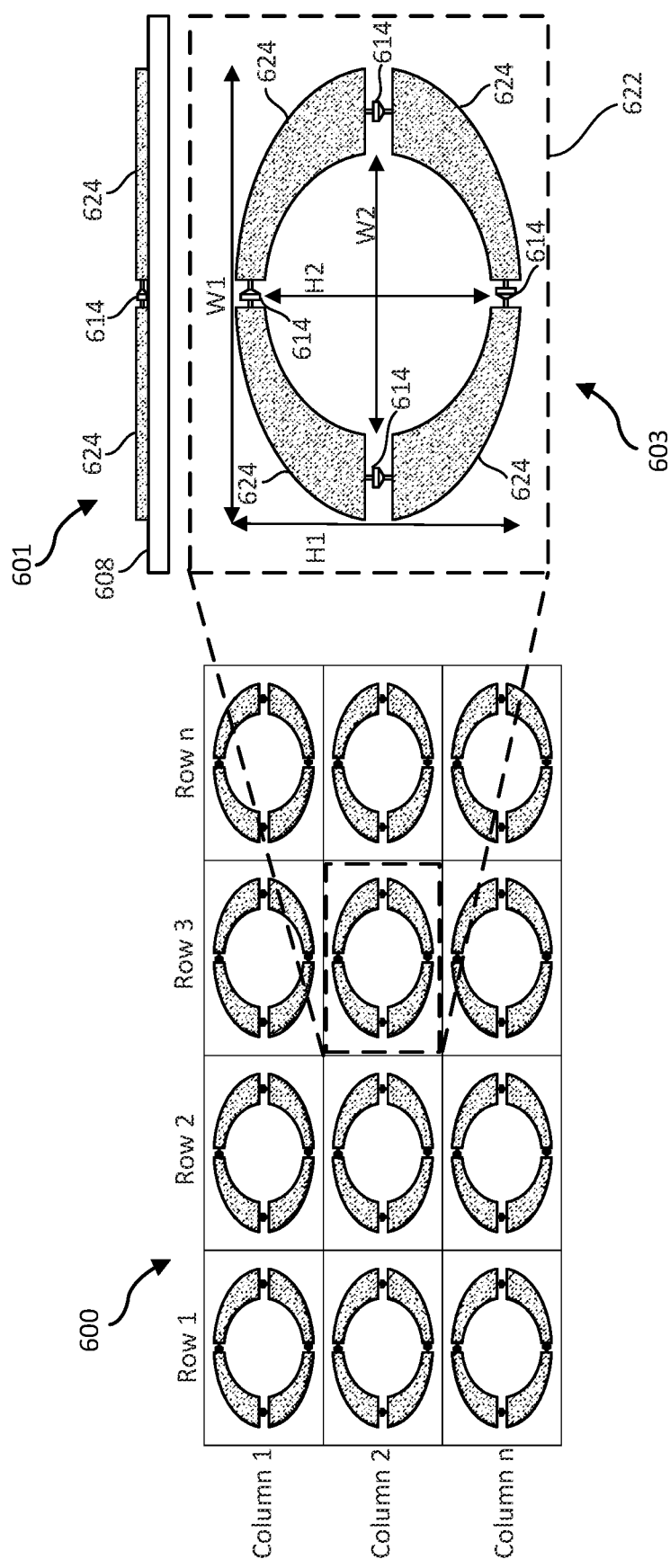
FIG. 6 illustrates a plan view of an array of patterned conductive materials and a detailed plan view and a detailed side view of a single patterned conductive material, according to at least one embodiment of the present disclosure.

FIG. 6 illustrates a plan view of an array 600 of patterned conductive materials and a detailed side view and plan view of a single patterned conductive material 622, according to at least one embodiment of the present disclosure. Array 600 may include a row and column grid of patterned conductive materials. Array 600 may include any number of patterned conductive materials in each row and in each column. The number of patterned conductive materials in each row may be based on a size of the individual patterned conductive materials, on a size of an area that array 600 is configured to shield from electromagnetic signals, and/or on a size of available space in an enclosure that houses array 600. Each of the patterned conductive materials may have a substantially oval shape (e.g., an elliptical shape) as shown in FIG. 6. Array 600 may include a repeated pattern of substantially oval shapes. For example, array 600 may include 4 rows and 4 columns as shown in FIG. 6. As another example, array 600 may include 1 row and 4 columns as shown in FIGS. 1 and 3.

FIG. 6 shows detailed side and plan views of a single patterned conductive material 622. Patterned conductive material 622 may have a substantially oval shape with any dimensions. For example, patterned conductive material 622 may include a long inner diameter W2 of between about 2 mm and about 11 mm, a short inner diameter H2 of between about 1 mm and about 10 mm, a long outer diameter W1 of between about 3 mm and about 14 mm, and a short outer diameter H1 of between about 3 mm and about 12 mm. These ranges of dimensions are given by way of example, and additional dimensions may be used in some applications. For example, the conducive material 622 may have a larger size to shield electromagnetic signals with a lower frequency or a smaller size to shield electromagnetic signals with a higher frequency. In some examples, long outer diameter W1 and/or short outer diameter H1 may be limited by the size of available space in an enclosure that houses array 600.

In some examples, patterned conductive material 622 may include at least two lobes 624 connected by a reactive circuit element 614. Although FIG. 6 shows four lobes 624 connected by four reactive circuit elements 614, the present disclosure is not so limited and patterned conductive material 622 may include any number of lobes 624 connected by any number of reactive circuit elements 614. Reactive circuit elements 614 may include capacitors and/or inductors. In some examples, patterned conductive material 622 may include an equal number of inductors and capacitors. In some examples, patterned conductive material 622 may include inductors disposed on opposite ends of patterned conductive material 622, each connecting adjacent lobes 624 to each other. In some examples, patterned conductive material 622 may include capacitors disposed on opposite ends of patterned conductive material 622, each connecting adjacent lobes 624 to each other. For example, each patterned conductive material 622 may include a capacitor at respective opposing ends of the patterned conductive material (e.g., left and right) and an inductor at respective opposing sides of the patterned conductive material (e.g., top and bottom). In some examples, disposing reactive circuit elements 614 between lobes 624 may allow dimensions H1, H2, W1, and/or W2 to be reduced while retaining a level of electromagnetic shielding as compared to an embodiment in which reactive circuit elements 614 are not disposed between lobes 624.

As shown in side view 601 and cross-sectional view 603, patterned conductive material 622 may be disposed on a non-conductive substrate 608. Non-conductive substrate 608 may include a flexible printed circuit board, a printed circuit board, a fiberglass substrate, a flexible plastic substrate, a polyimide substrate, a polymer thick film, or a combination thereof. Non-conductive substrate 608 may have a thickness of less than about 10 microns, about 10 microns to about 30 microns, about 30 microns to about 50 microns, about 50 microns to about 70 microns, about 70 microns to about 100 microns, or more. In some examples, non-conductive substrate 608 may have a dielectric constant of about 4 to about 6, of about 6 to about 8, of about 8 to about 10, or greater than 10.

Patterned conductive material 622 may include lobes 624 disposed on non-conductive substrate 608. Adjacent lobes 624 may be connected by reactive circuit elements 614. Lobes 624 may include a conductive material such as a metamaterial, a metal (e.g., copper, brass, nickel, silver, steel, tin, gold, etc.), a metal alloy, a conductive screen, a mesh, or a combination thereof. Patterned conductive material 622 may be configured as a film (e.g., a so-called thick film) having a thickness of between 50 microns and 200 microns. Patterned conductive material 622 may be disposed on non-conductive substrate 608 using methods including, without limitation, electroplating, chemical vapor deposition, etching, bonding, screening, sputtering, evaporation, or a combination thereof.

Patterned conductive material 622 and reactive circuit elements 614 disposed on non-conductive substrate 608 may be configured to have a resonant frequency based on a variety of parameters. The resonant frequency of patterned conductive material 622 may be a center frequency within a band of frequencies which patterned conductive material 622 is configured to shield. For example, patterned conductive material 622 disposed on non-conductive substrate 608 may have a resonant frequency in the range of 2.4 GHz to 2.5 GHz. Shielding a user from electromagnetic signals in the frequency range of 2.4 GHz to 2.5 GHz may reduce the amount of radiation absorbed by the user when the wearable electronic device is communicating using WiFi frequency bands (e.g., frequency bands 1 through 14 as defined in the Institute of Electrical and Electronic Engineers networking standard 802). In some examples, the resonant frequency may be based on, without limitation, the values of reactive circuit elements 614, the geometry of lobes 624 (e.g., length, width, thickness, radius of curvature, shape, etc.), a dielectric constant of non-conductive substrate 608, the geometry of non-conductive substrate 608 (e.g., length, width, thickness, radius of curvature, shape, etc.), the conductivity of the patterned conductive material 622, or a combination thereof. The resonant frequency of patterned conductive material 622 disposed on non-conductive substrate 608 may be altered by altering one or more of these parameters, such as to shield an electromagnetic signal exhibiting a different frequency.

Although FIG. 6 illustrates the patterned conductive material 622 in the general shape of an oval, the present disclosure is not so limited. In additional examples, patterned conductive material 622 may have another shape, such as square, rectangular, spiral, or irregular.

Figure 7:
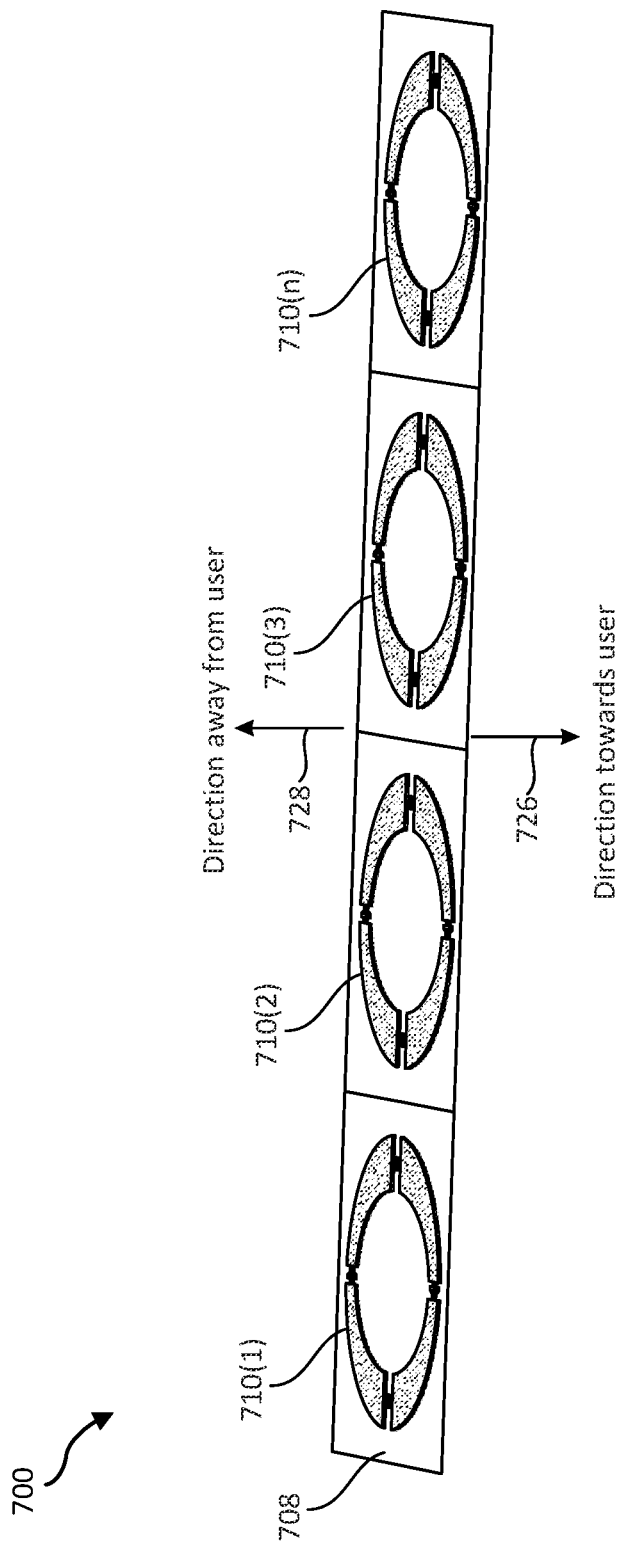
FIG. 7 illustrates a perspective view of an array of patterned conductive materials and a respective direction of electromagnetic radiation, according to at least one embodiment of the present disclosure.

FIG. 7 illustrates a perspective view of an array 700 of patterned conductive materials 710(1) . . . 719(n) and a respective direction of electromagnetic radiation propagation, according to at least one embodiment of the present disclosure. As described above with reference to FIGS. 1-6, patterned conductive materials 710(1) . . . 719(n) (e.g., a metamaterial) disposed on a non-conductive substrate 708 may be shaped and configured to reduce electromagnetic signals radiated in a first direction indicated by arrow 726 (e.g., a direction towards a user of a wearable electronic device) and to increase the electromagnetic signals radiated in a second, different direction indicated by arrow 728 (e.g., an opposite direction away from the user of the wearable electronic device). Patterned conductive materials 710(1) . . . 710(n) disposed on non-conductive substrate 708 may be configured to function as frequency-selective shielding for antenna radiation. When disposed in a wearable device, patterned conductive materials 710(1) . . . 710(n) disposed on non-conductive substrate 708 may at least partially shield a user from absorbing electromagnetic radiation over a certain level. For example, patterned conductive materials 710(1) . . . 710(n) disposed on a non-conductive substrate 708 may shield a user from absorbing electromagnetic radiation over a specific absorption rate set by a regulating agency.

Figure 8:
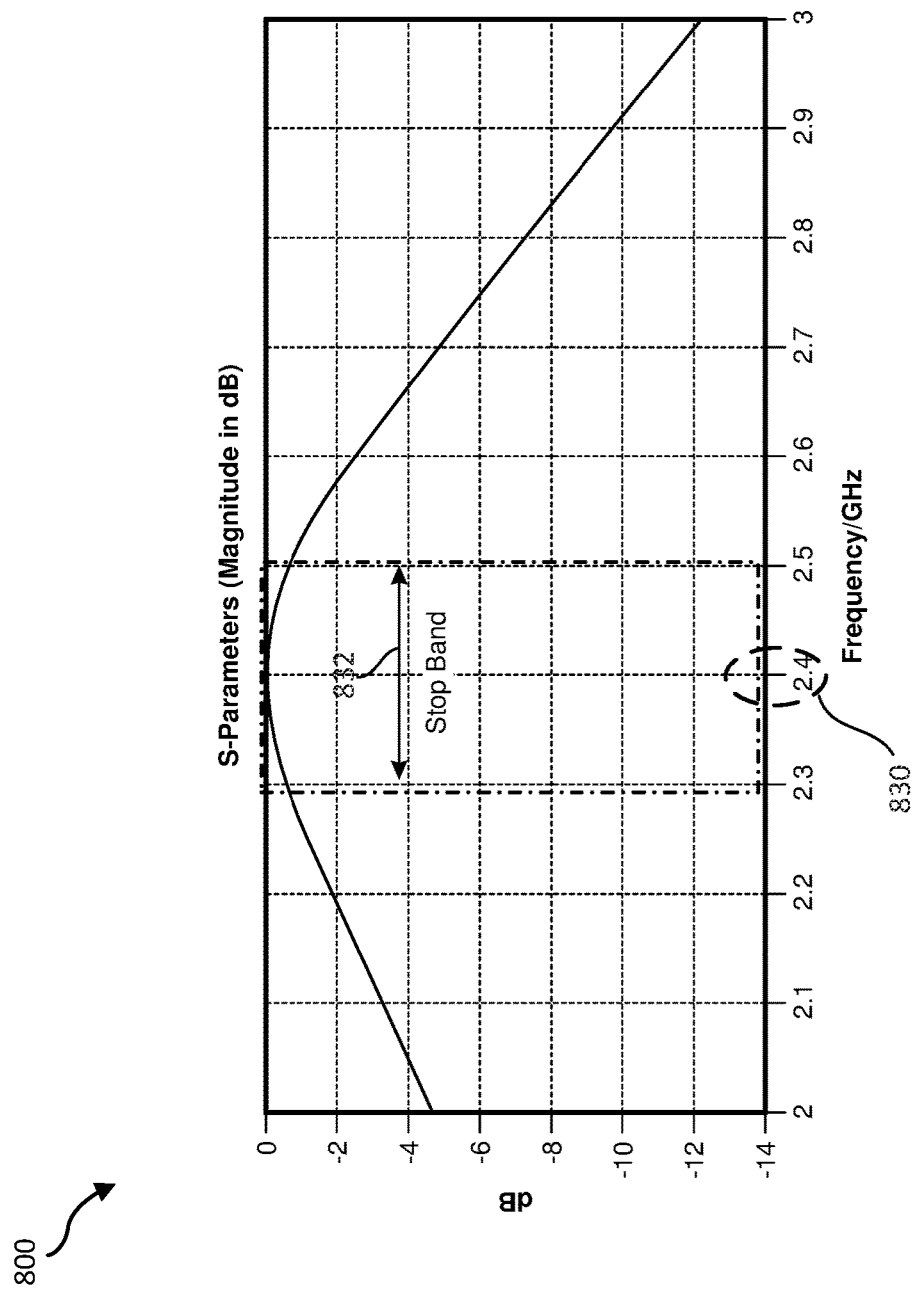
FIG. 8 is a chart illustrating band-stop parameters of patterned conductive materials, according to at least one embodiment of the present disclosure.

FIG. 8 shows a chart 800 illustrating band-stop parameters of patterned conductive materials disposed on a non-conductive substrate, according to at least one embodiment of the present disclosure. Stop band 832 may be a frequency range in which patterned conductive materials (e.g., patterned conductive materials 710(1) . . . 710(n) of FIG. 7) disposed on a non-conductive substrate (e.g., non-conductive substrate 708 of FIG. 7) may reduce electromagnetic signals radiated in a first direction (e.g., a direction towards a user of a wearable electronic device) and increase the electromagnetic signals radiated in a second, different direction (e.g., an opposite direction away from the user of the wearable electronic device).

As shown in FIG. 8 by way of example, stop band 832 may be centered about a resonant frequency 830 of 2.4 Ghz. Although chart 800 shows a stop band 832 between about 2.3 GHz and about 2.5 Ghz, the present disclosure is not so limited. As described above with reference to FIG. 6, resonant frequency 830 may be based on the values of reactive circuit elements connecting the lobes, the geometry of the lobes (e.g., length, width, thickness, radius of curvature, shape, etc.), a dielectric constant of the non-conductive substrate the patterned conductive materials are disposed on, the geometry of the non-conductive substrate (e.g., length, width, thickness, radius of curvature, shape, etc.), the conductivity of the patterned conductive material, or a combination thereof. For example, when the values (e.g., capacitance, inductance) of the reactive circuits are increased, resonant frequency 830 may decrease. In some examples, when the dielectric constant of the non-conductive substrate is increased, resonant frequency 830 may decrease. When the size (e.g., length) of the patterned conductive material is increased, resonant frequency 830 may decrease.

FIG. 9 shows a chart 900 illustrating directional antenna gain resulting from an antenna shield, according to at least one embodiment of the present disclosure. Patterned conductive materials disposed on a non-conductive substrate may be configured to function as frequency-selective shielding for antenna radiation. As described above with reference to FIGS. 1-6, patterned conductive materials (e.g., patterned conductive materials 710(1) . . . 710(n) of FIG. 7) disposed on a non-conductive substrate (e.g., non-conductive substrate 708 of FIG. 7) may be shaped and configured to reduce electromagnetic signals radiated by an antenna in a first direction (e.g., a direction towards a user of a wearable electronic device) and to increase the electromagnetic signals radiated in a second, different direction (e.g., an opposite direction away from the user).

Chart 900 shows the directional antenna gain for two systems. The first system may include a radiating antenna and patterned conductive materials disposed on a non-conductive substrate configured to function as frequency selected shielding for antenna radiation as described in the present disclosure. An example directional antenna gain for the first system is indicated by plot 940. The second system may include a radiating antenna without patterned conductive materials disposed on a non-conductive substrate configured to function as frequency selected shielding for antenna radiation as described in the present disclosure. An example directional antenna gain for the second system is indicated by plot 938. A center position of the chart may indicate a relative position of the antenna with respect to the antenna gain patterns (e.g., plots 938, 940). The lower half of chart 900 (e.g., approximately 180 to 360 degrees) may indicate a position of a user with respect to the antenna (e.g., a "User Side"). The upper half of chart 900 (e.g., approximately 0 to 180 degrees) may indicate an ambient environment with respect to the antenna (e.g., a "World Side" away from the user). The second system antenna gain as shown in plot 938 is substantially omnidirectional, resulting in about the same amount of antenna radiation directed towards the user as directed away from the user. The first system antenna gain as shown in plot 940 is substantially directional, resulting in a decrease in the amount of antenna radiation directed towards the user and an increase in the amount of antenna radiation directed away from the user. Embodiments of the present disclosure may improve total antenna radiation efficiency due to less antenna radiation (e.g., electromagnetic signals) being absorbed by the user and more antenna radiation reflected by the patterned conductive material disposed on a non-conductive substrate to the ambient environment (e.g., towards an access point, towards a base station, etc.).

Figure 10:
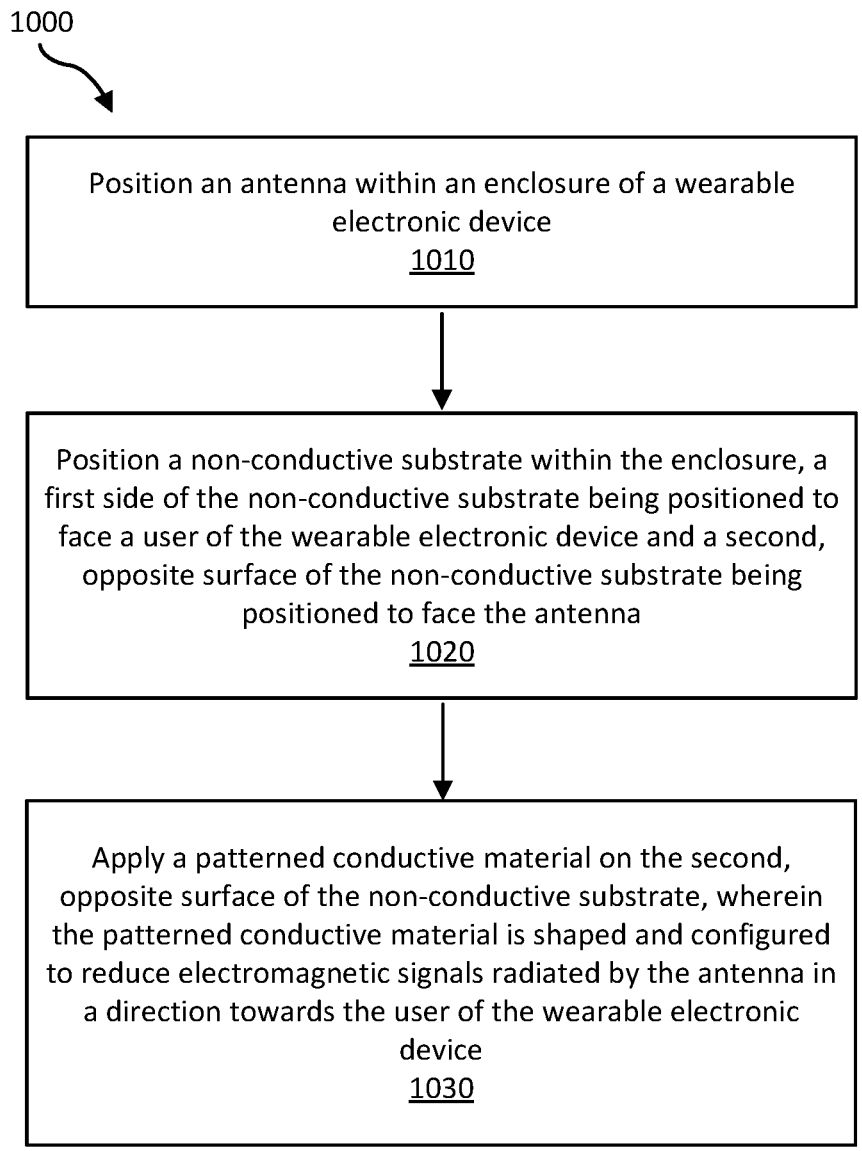
FIG. 10 is a flow diagram illustrating an example method of manufacturing a wearable device antenna shield, according to at least one embodiment of the present disclosure.

FIG. 10 is a flow diagram illustrating an example method 1000 of manufacturing a wearable device antenna shield, according to at least one embodiment of the present disclosure. At operation 1010, method 1000 may include positioning an antenna within an enclosure of a wearable electronic device. Operation 1010 may be performed in a variety of ways, as will be understood by one skilled in the art considering the present disclosure. For example, the antenna may include a planar layer of conductive material (e.g., metal, copper, etc.) embedded and/or disposed on a printed circuit board (e.g., printed circuit board 418, 518). The printed circuit board may include components (e.g., processors, memory, connectors, radio frequency circuit 520, etc.) that enable wireless communications. The antenna may be disposed within an enclosure of a wearable electronic device (e.g., smart eyeglasses, a temple arm of smart eyeglasses, a watch body, a smartwatch, etc.).

At operation 1020, method 1000 may include positioning a non-conductive substrate within the enclosure, a first surface of the non-conductive substrate being positioned to face a user of the wearable electronic device and a second, opposite surface of the non-conductive substrate being positioned to face the antenna. Operation 1020 may be performed in a variety of ways, as will be understood by one skilled in the art considering the present disclosure. For example, positioning a non-conductive substrate within the enclosure may be performed as described above with reference to FIGS. 3-6.

At operation 1030, method 1000 may include applying a patterned conductive material on the second, opposite surface of the non-conductive substrate, wherein the patterned conductive material is shaped and configured to reduce electromagnetic signals radiated by the antenna in a direction towards the user of the wearable electronic device. Operation 1030 may be performed in a variety of ways, as will be understood by one skilled in the art considering the present disclosure. For example, applying a patterned conductive material on the second, opposite surface of the non-conductive substrate, wherein the patterned conductive material is shaped and configured to reduce electromagnetic signals radiated by the antenna in a direction towards the user of the wearable electronic device may be performed as described above with reference to FIGS. 3-7. In some examples, operation 1030 may further include positioning circuit components (e.g., reactive circuit element 614 of FIG. 6) on the second, opposite surface of the non-conductive substrate. Operation 1030 may further include a solder reflow process configured to electrically connect reactive circuit element 614 to the patterned conductive material as described with reference to FIG. 6 above.

As described in detail above, embodiments of the present disclosure may include controlling the direction of RF radiation in a mobile electronic device (e.g., a wearable device, smart eyeglasses, a smartwatch, a wristband system, etc.). For example, a wearable device may include an enclosure (e.g., a temple arm, a frame, etc.), and an antenna positioned within the enclosure. The antenna may be configured to radiate electromagnetic signals in conformance with a wireless communication standard (e.g., WiFi, Bluetooth™, 4G, 5G, 6G, etc.). The wearable device may include a non-conductive substrate positioned within the enclosure, one surface of the non-conductive substrate may face a user of the wearable device and a second, opposite surface of the non-conductive substrate may face the antenna. A patterned conductive material may be disposed on the second, opposite surface of the non-conductive substrate. The patterned conductive material may be shaped and configured to reduce electromagnetic signals radiated in a direction towards the user of the wearable electronic device and increase the electromagnetic signals radiated in a direction away from the user of the wearable electronic device.

In particular embodiments, one or more objects (e.g., data associated with sensors, and/or activity information) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, a biometric data acquisition application, an artificial-reality application, smart eyeglasses 100 of FIG. 1, smart eyeglasses 202 of FIG. 2, eyewear device 1802 of FIG. 18, virtual-reality system 1900 of FIG. 19, head-mounted display 2102 of FIG. 21, augmented-reality glasses 2220 of FIG. 22, or any other suitable computing system or application. Although the examples discussed herein are in the context of a smart eyeglasses and/or artificial-reality system, these privacy settings may be applied to any other suitable computing system.

Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within a wristband application and/or artificial-reality application. When privacy settings for an object allow a particular user or other entity to access that object, the object may be described as being "visible" with respect to that user or other entity. As an example and not by way of limitation, a user of the wristband application and/or artificial-reality application may specify privacy settings for a user-profile page that identify a set of users that may access the wristband application and/or artificial-reality application information on the user-profile page, thus excluding other users from accessing that information. As another example and not by way of limitation, smart eyeglasses 100 of FIG. 1, smart eyeglasses 200 of FIG. 2, eyewear device 1802 of FIG. 18, virtual-reality system 1900 of FIG. 19, head-mounted display 2102 of FIG. 21, augmented-reality glasses 2220 of FIG. 22 may store privacy policies/guidelines. The privacy policies/guidelines may specify what information of users may be accessible by which entities and/or by which processes (e.g., internal research, advertising algorithms, machine-learning algorithms, etc.), thus ensuring only certain information of the user may be accessed by certain entities or processes.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. Although this disclosure describes using particular privacy settings in a particular manner, this disclosure contemplates using any suitable privacy settings in any suitable manner.

In particular embodiments, smart eyeglasses 100 of FIG. 1, smart eyeglasses 202 of FIG. 2, eyewear device 1802 of FIG. 18, virtual-reality system 1900 of FIG. 19, head-mounted display 2102 of FIG. 21, augmented-reality glasses 2220 of FIG. 22 may present a so-called "privacy wizard" (e.g., within a webpage, a module, one or more dialog boxes, a display screen of the smart eyeglasses, the display screen of the artificial-reality application, or any other suitable interface) to a first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof.

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, different objects of the same type associated with a user may have different privacy settings. In particular embodiments, one or more default privacy settings may be set for each object of a particular object-type.

In particular embodiments, smart eyeglasses 100 of FIG. 1, smart eyeglasses 202 of FIG. 2, eyewear device 1802 of FIG. 18, virtual-reality system 1900 of FIG. 19, head-mounted display 2102 of FIG. 21, augmented-reality glasses 2220 of FIG. 22 may have functionalities that may use, as inputs, biometric information of a user for user-authentication or experience-personalization purposes. A user may opt to make use of these functionalities to enhance their experience on the smart eyeglasses and/or artificial-reality system. As an example and not by way of limitation, a user may provide biometric information to the smart eyeglasses and/or artificial-reality system. The user's privacy settings may specify that such information may be used only for particular processes, such as authentication, and further specify that such information may not be shared with any third-party system or used for other processes or applications associated with the smart eyeglasses and/or artificial-reality system. As another example and not by way of limitation, the smart eyeglasses and/or artificial-reality system may provide a functionality for a user to provide biometric information to the smart eyeglasses and/or artificial-reality system. The user's privacy setting may specify that such biometric information may not be shared with any third-party system or used by other processes or applications associated with the smart eyeglasses and/or artificial-reality system. As another example and not by way of limitation, the smart eyeglasses and/or artificial-reality system may provide a functionality for a user to provide a reference image (e.g., a facial profile, a retinal scan) to the smart eyeglasses and/or artificial-reality system. The smart eyeglasses and/or artificial-reality system may compare the reference image against a later-received image input (e.g., to authenticate the user). The user's privacy setting may specify that such biometric information may be used only for a limited purpose (e.g., authentication), and further specify that such biometric information may not be shared with any third-party system or used by other processes or applications associated with the smart eyeglasses and/or artificial-reality system.

As described in detail above, the present disclosure details systems, devices, and methods related to an antenna architecture of a mobile electronic device (e.g., a wearable device). The antenna architecture may include multiple antennas that enable wireless communication for the mobile electronic device. The multiple antennas may include a slot antenna, a patch antenna, a trace antenna, a branch antenna, and/or an enclosure antenna. The antenna architecture may include an impedance tuning circuit that compensates for antenna performance loss when the mobile electronic device is proximate to a user. A proximity sensor may detect the proximity of the mobile electronic device to a user and match the impedance of the antennas to the impedance of a circuit driving the antennas thereby increasing the performance of the antennas and the performance of the wireless communications in the mobile electronic device.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
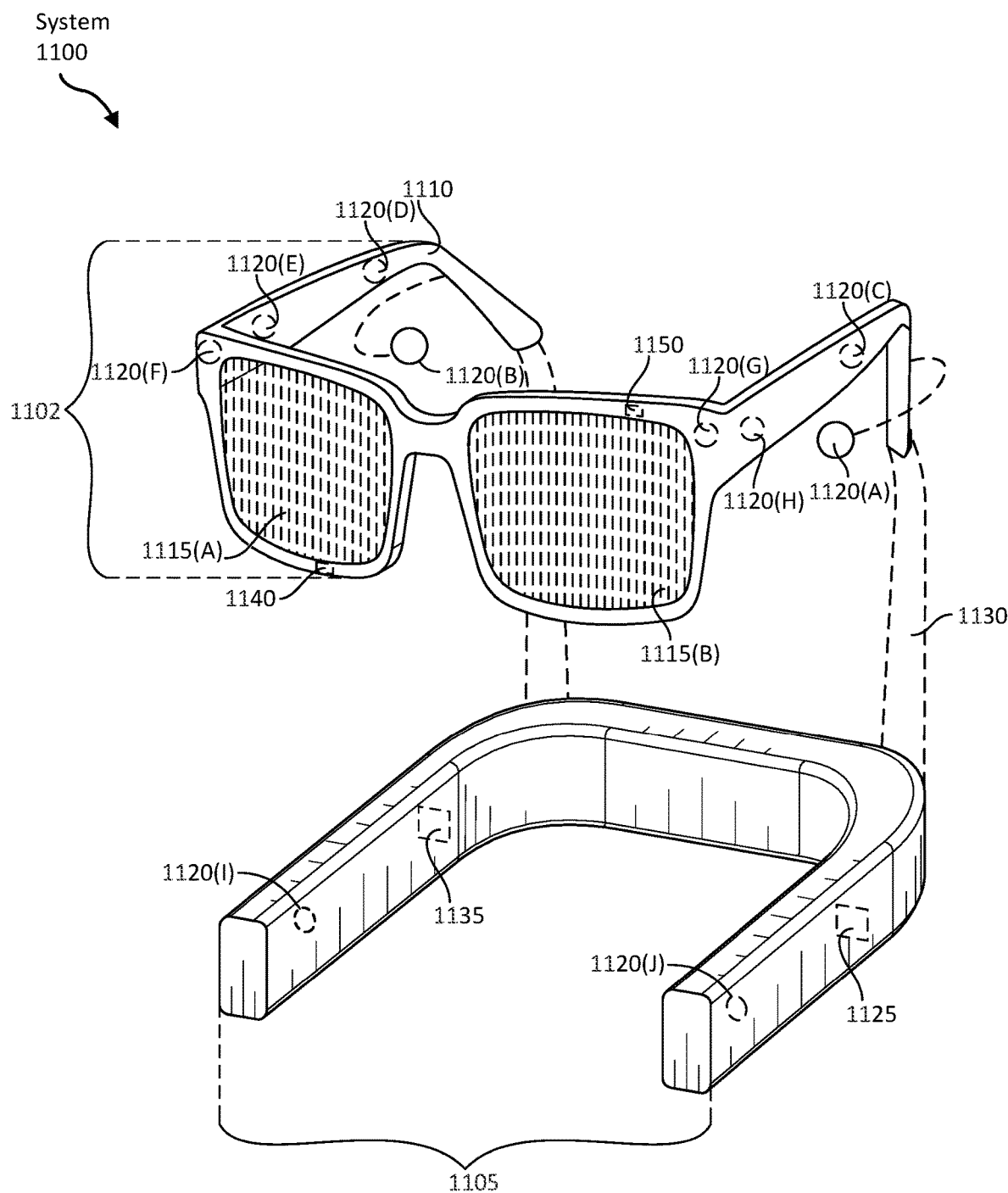
FIG. 11 is an illustration of exemplary augmented-reality glasses that may be used in connection with embodiments of this disclosure.

Turning to FIG. 11, augmented-reality system 1100 may include an eyewear device 1102 with a frame 1110 configured to hold a right display device 1115(A) and a left display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 12 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wristbands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1100 and 1200 of FIGS. 11 and 12, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 1100 and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
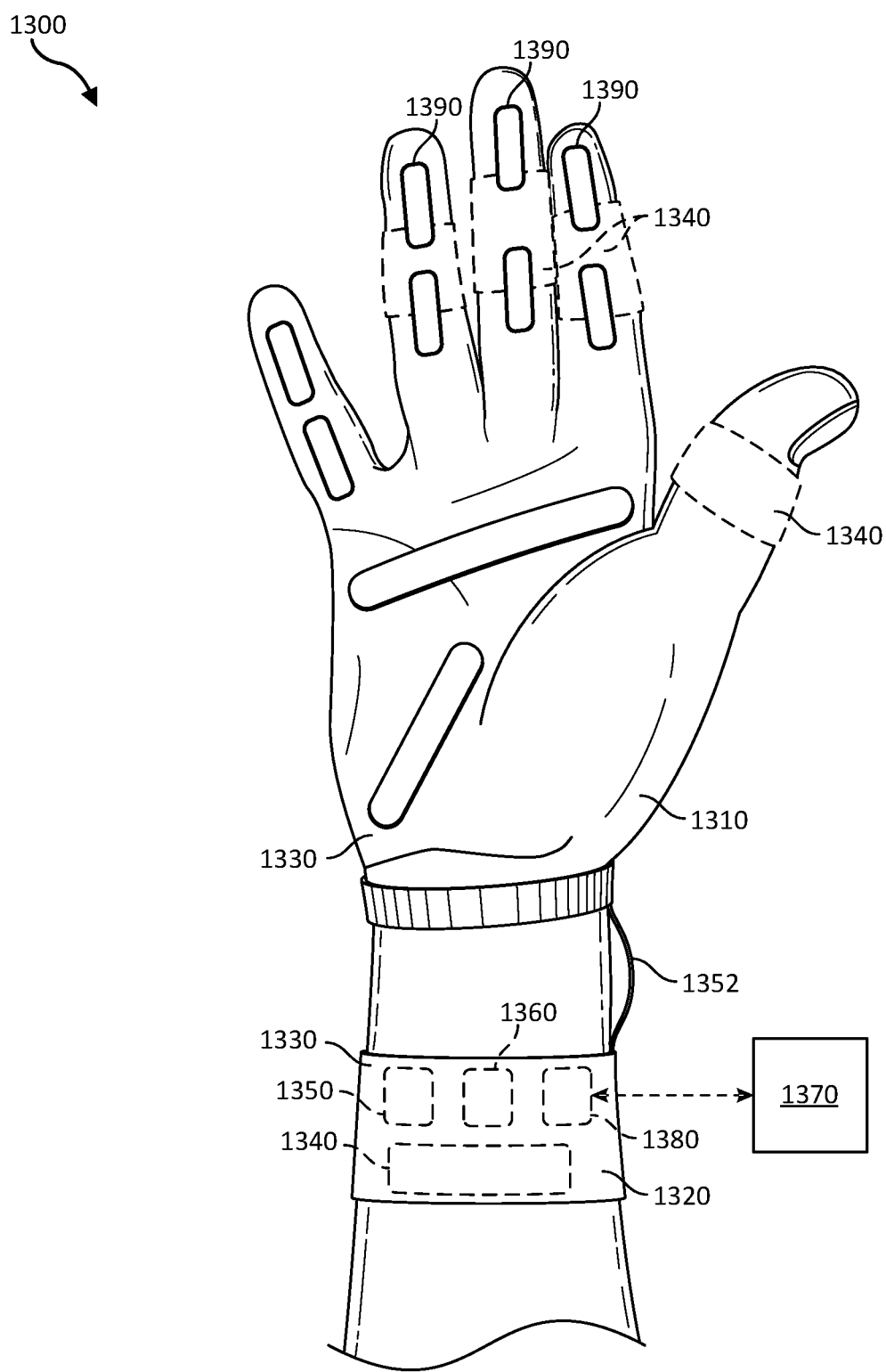
FIG. 13 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands (e.g., such as smart eyeglasses 100 and 202, described above), etc.). As an example, FIG. 13 illustrates a vibrotactile system 1300 in the form of a wearable glove (haptic device 1310) and wristband (e.g., smart eyeglasses 100 of FIG. 1, haptic device 1320). Haptic device 1310 and haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a wristband, a watch band, a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned against the user's finger(s), thumb, or wrist, as shown in FIG. 13. Vibrotactile devices 1340 may, in some examples, be sufficiently flexible to conform to or bend with the user's corresponding body part(s).

A power source 1350 for applying a voltage to the vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be watch body 300, a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1380 may enable communications between vibrotactile system 1300 and the other device or system 1370 via a wireless link or a wired link. If present, communications interface 1380 may be in communication with processor 1360, such as to provide a signal to processor 1360 to activate or deactivate one or more of the vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
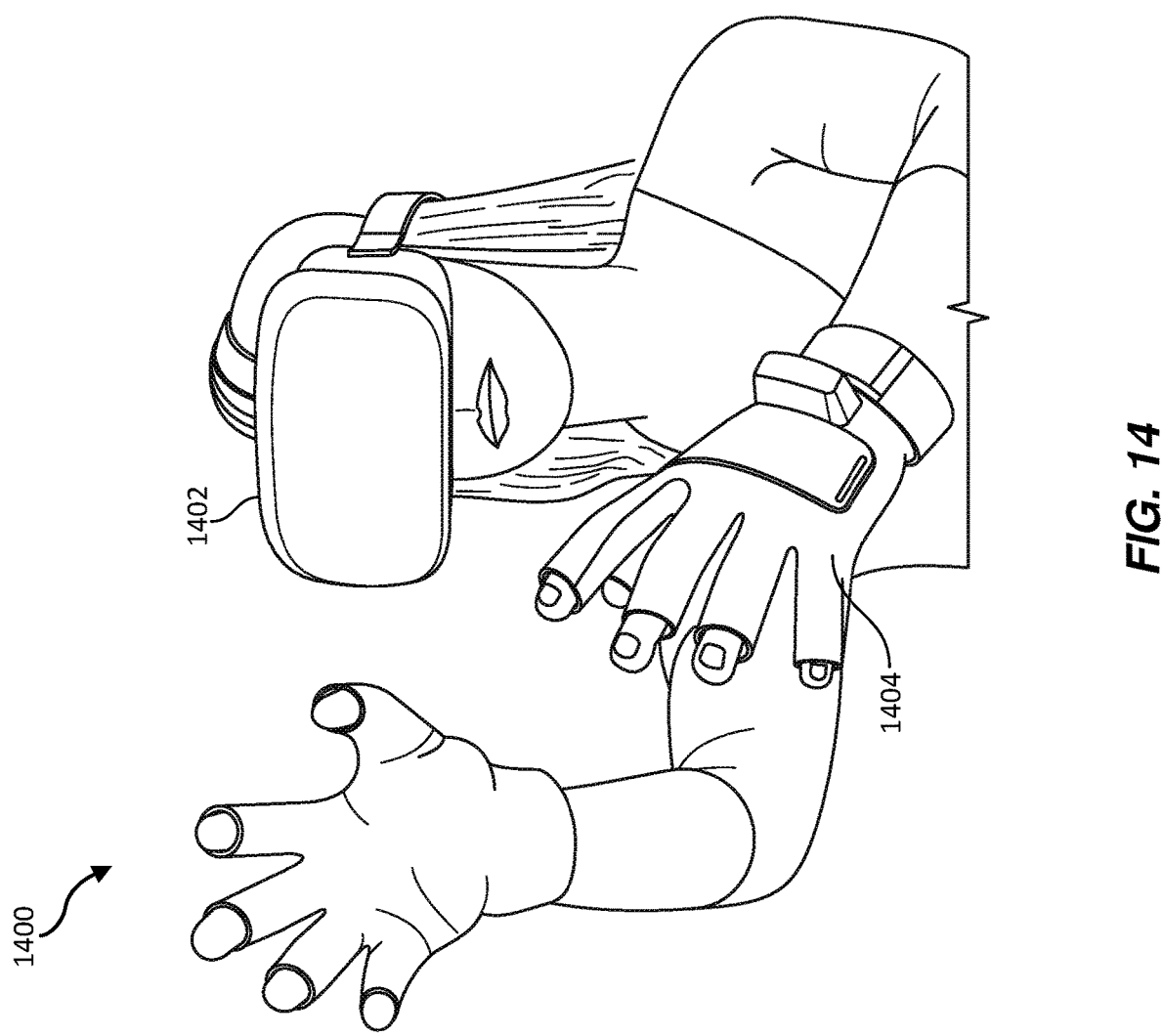
FIG. 14 is an illustration of an exemplary virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 12:
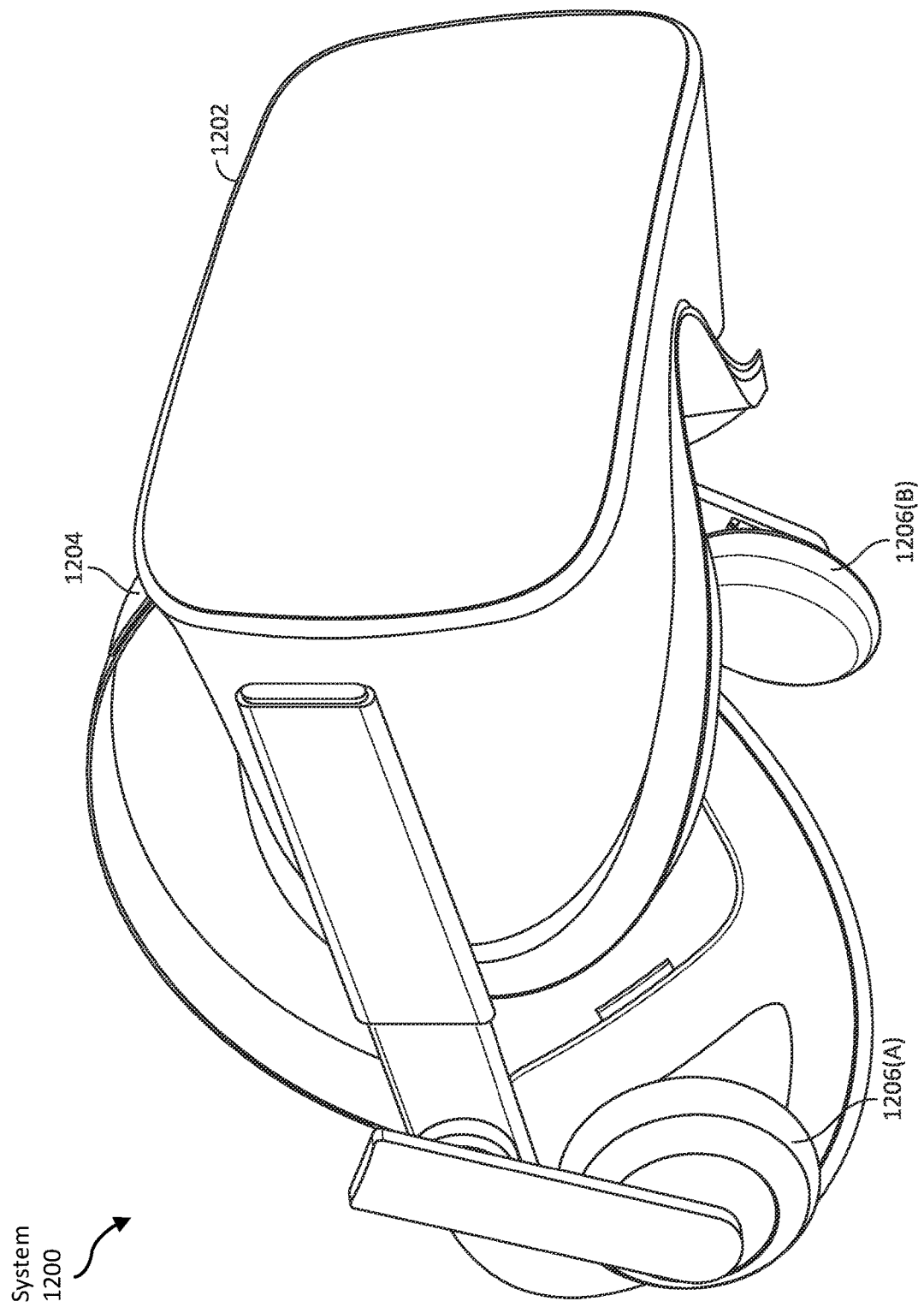
FIG. 12 is an illustration of an exemplary virtual-reality headset that may be used in connection with embodiments of this disclosure.

Head-mounted display 1402 generally represents any type or form of virtual-reality system, such as virtual-reality system 1200 in FIG. 12. Haptic device 1404 generally represents any type or form of wearable device, worn by a user of an artificial-reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

Figure 15:
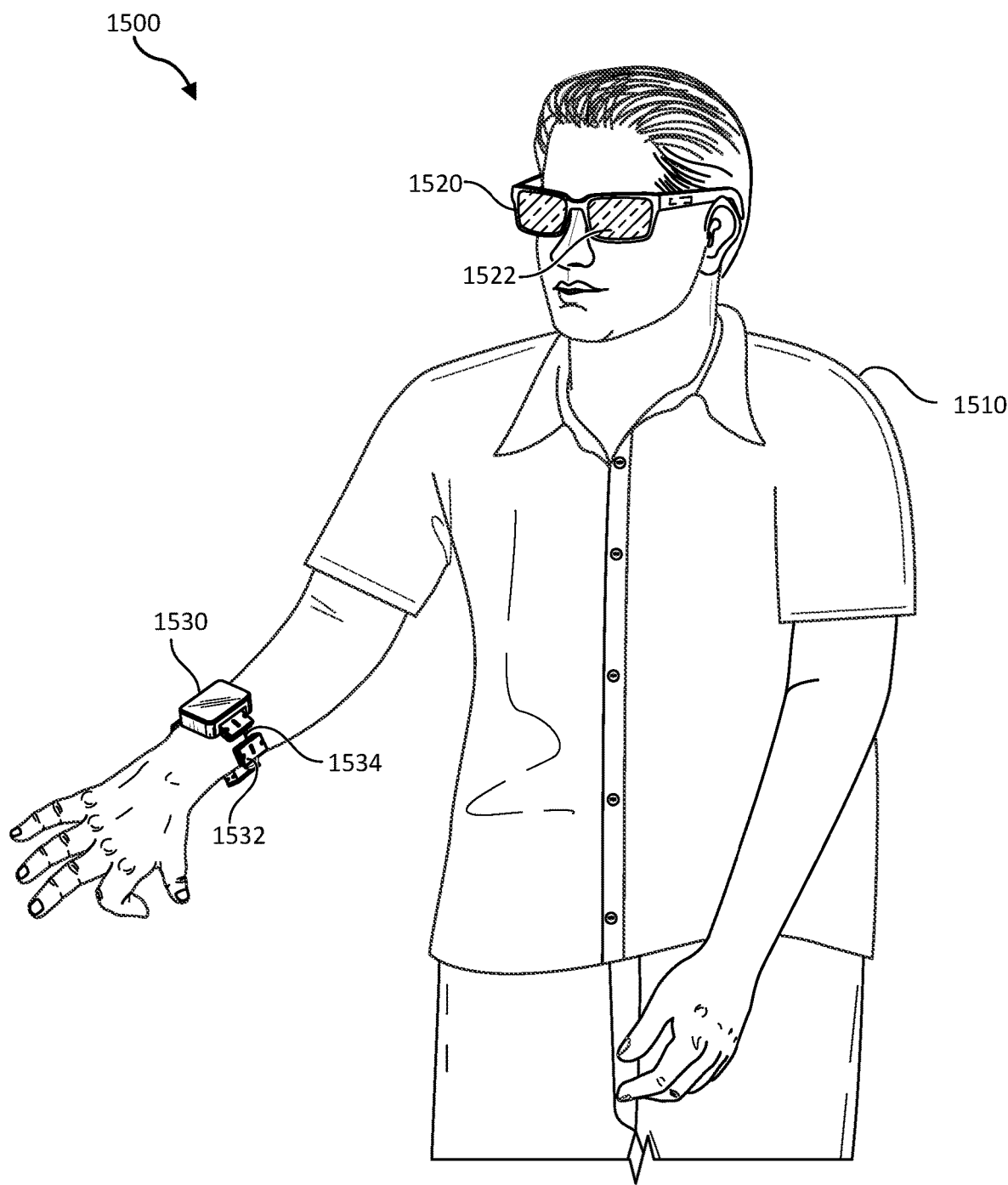
FIG. 15 is an illustration of an exemplary augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view of a user 1510 interacting with an augmented-reality system 1500. In this example, user 1510 may wear a pair of augmented-reality glasses 1520 that may have one or more displays 1522 and that are paired with a haptic device 1530. In this example, haptic device 1530 may be a wristband (e.g., such as smart eyeglasses 100 and smart eyeglasses 202 described above) that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A wearable electronic device, comprising an enclosure, an antenna positioned within the enclosure and configured to radiate electromagnetic signals, a non-conductive substrate positioned within the enclosure, a first surface of the non-conductive substrate being in a position to face a user of the wearable electronic device and a second, opposite surface of the non-conductive substrate facing the antenna, and a patterned conductive material disposed on the second, opposite surface of the non-conductive substrate, wherein the patterned conductive material is patterned such that electromagnetic signals radiated in a direction towards the user of the wearable electronic device are reduced.

Example 2: The wearable electronic device of Example 1, wherein the patterned conductive material is patterned such that the electromagnetic signals radiated in a direction away from the user of the wearable electronic device are increased.

Example 3: The wearable electronic device of Example 1 or Example 2, wherein the shape of the patterned conductive material comprises a substantially oval shape.

Example 4: The wearable electronic device of Example 3, wherein the substantially oval shape has a long inner diameter of between about 3 mm and about 4 mm, a short inner diameter of between about 2 mm and about 4 mm, a long outer diameter of between about 5 mm and about 7 mm, and a short outer diameter of between about 4 mm and about 6 mm.

Example 5: The wearable electronic device of Example 3, wherein the patterned conductive material comprises a repeated pattern of substantially oval shapes.

Example 6: The wearable electronic device of any of Examples 1 through 5, wherein the patterned conductive material comprises at least two lobes connected by a reactive circuit element.

Example 7: The wearable electronic device of Example 6, wherein the patterned conductive material is configured to have a resonant frequency based at least on a value of the reactive circuit element.

Example 8: The wearable electronic device of Example 6, wherein the reactive circuit element comprises at least one capacitor.

Example 9: The wearable electronic device of Example 6, wherein the reactive circuit element comprises at least one inductor.

Example 10: The wearable electronic device of any of Examples 1 through 9, wherein the patterned conductive material comprises a copper film.

Example 11: The wearable electronic device of Example 10, wherein the copper film has a thickness of between 50 microns and 200 microns.

Example 12: The wearable electronic device of any of Examples 1 through 11, wherein the non-conductive substrate comprises a flexible printed circuit board.

Example 13: The wearable electronic device of any of Examples 1 through 12, wherein the patterned conductive material is electrically isolated from other conductive materials within the enclosure.

Example 14: The wearable electronic device of any of Examples 1 through 13, wherein the patterned conductive material comprises a plurality of repeating units of conductive materials.

Example 15: The wearable electronic device of any of Examples 1 through 14, wherein the enclosure comprises a temple arm of eyeglasses.

Example 16: The wearable electronic device of any of Examples 1 through 15, wherein the patterned conductive material is configured to have a resonant frequency in a frequency range of about 2400 MHz to about 2500 MHz.

Example 17: The wearable electronic device of any of Examples 1 through 16, wherein the patterned conductive material is configured to have a resonant frequency based on at least a geometry of the patterned conductive material.

Example 18: The wearable electronic device of any of Examples 1 through 17, wherein the patterned conductive material is configured to have a resonant frequency based on at least a dielectric constant of the non-conductive substrate.

Example 19: A system including augmented-reality eyeglasses, an antenna positioned within a temple arm of the augmented-reality eyeglasses and configured to radiate electromagnetic signals, a non-conductive substrate positioned within the temple arm, a first surface of the non-conductive substrate being in a position to face a user of the augmented-reality eyeglasses and a second, opposite surface of the non-conductive substrate facing the antenna, and a patterned conductive material disposed on the second, opposite surface of the non-conductive substrate, wherein the patterned conductive material is shaped and configured to reduce electromagnetic signals radiated in a direction towards the user of the augmented-reality eyeglasses and increase electromagnetic signals radiated in a direction away from the user of the augmented-reality eyeglasses.

Example 20: A method of manufacturing, including positioning an antenna within an enclosure of a wearable electronic device, positioning a non-conductive substrate within the enclosure, a first surface of the non-conductive substrate being positioned to face a user of the wearable electronic device and a second, opposite surface of the non-conductive substrate being positioned to face the antenna, and applying a patterned conductive material on the second, opposite surface of the non-conductive substrate, wherein the patterned conductive material is shaped and configured to reduce electromagnetic signals radiated by the antenna in a direction towards the user of the wearable electronic device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable electronic device, comprising:
   an enclosure;
   an antenna positioned within the enclosure and configured to radiate electromagnetic signals;
   a non-conductive substrate positioned within the enclosure, a first surface of the non-conductive substrate being in a position to face a user of the wearable electronic device and a second, opposite surface of the non-conductive substrate facing the antenna; and
   a patterned conductive material disposed on the second, opposite surface of the non-conductive substrate, wherein the patterned conductive material is patterned such that electromagnetic signals radiated in a direction towards the user of the wearable electronic device are reduced.

2. The wearable electronic device of claim 1, wherein the patterned conductive material is patterned such that the electromagnetic signals radiated in a direction away from the user of the wearable electronic device are increased.

3. The wearable electronic device of claim 1, wherein a shape of the patterned conductive material comprises a substantially oval shape.

4. The wearable electronic device of claim 3, wherein the substantially oval shape has a long inner diameter of between about 3 mm and about 4 mm, a short inner diameter of between about 2 mm and about 4 mm, a long outer diameter of between about 5 mm and about 7 mm, and a short outer diameter of between about 4 mm and about 6 mm.

5. The wearable electronic device of claim 3, wherein the patterned conductive material comprises a repeated pattern of substantially oval shapes.

6. The wearable electronic device of claim 1, wherein the patterned conductive material comprises at least two lobes connected by a reactive circuit element.

7. The wearable electronic device of claim 6, wherein the patterned conductive material is configured to have a resonant frequency based at least on a value of the reactive circuit element.

8. The wearable electronic device of claim 6, wherein the reactive circuit element comprises at least one capacitor.

9. The wearable electronic device of claim 6, wherein the reactive circuit element comprises at least one inductor.

10. The wearable electronic device of claim 1, wherein the patterned conductive material comprises a copper film.

11. The wearable electronic device of claim 10, wherein the copper film has a thickness of between 50 microns and 200 microns.

12. The wearable electronic device of claim 1, wherein the non-conductive substrate comprises a flexible printed circuit board.

13. The wearable electronic device of claim 1, wherein the patterned conductive material is electrically isolated from other conductive materials within the enclosure.

14. The wearable electronic device of claim 1, wherein the patterned conductive material comprises a plurality of repeating units of conductive materials.

15. The wearable electronic device of claim 1, wherein the enclosure comprises a temple arm of eyeglasses.

16. The wearable electronic device of claim 1, wherein the patterned conductive material is configured to have a resonant frequency in a frequency range of about 2400 MHz to about 2500 MHz.

17. The wearable electronic device of claim 1, wherein the patterned conductive material is configured to have a resonant frequency based on at least a geometry of the patterned conductive material.

18. The wearable electronic device of claim 1, wherein the patterned conductive material is configured to have a resonant frequency based on at least a dielectric constant of the non-conductive substrate.

19. A system comprising:
    augmented-reality eyeglasses;
    an antenna positioned within a temple arm of the augmented-reality eyeglasses and configured to radiate electromagnetic signals;
    a non-conductive substrate positioned within the temple arm, a first surface of the non-conductive substrate being in a position to face a user of the augmented-reality eyeglasses and a second, opposite surface of the non-conductive substrate facing the antenna; and
    a patterned conductive material disposed on the second, opposite surface of the non-conductive substrate, wherein the patterned conductive material is shaped and configured to:
        reduce electromagnetic signals radiated in a direction towards the user of the augmented-reality eyeglasses; and
        increase electromagnetic signals radiated in a direction away from the user of the augmented-reality eyeglasses.

20. A method of manufacturing, comprising:
    positioning an antenna within an enclosure of a wearable electronic device;
    positioning a non-conductive substrate within the enclosure, a first surface of the non-conductive substrate being positioned to face a user of the wearable electronic device and a second, opposite surface of the non-conductive substrate being positioned to face the antenna; and applying a patterned conductive material on the second, opposite surface of the non-conductive substrate, wherein the patterned conductive material is shaped and configured to reduce electromagnetic signals radiated by the antenna in a direction towards the user of the wearable electronic device.

* * * * *